US009181067B1

(12) United States Patent
Nyren et al.

(10) Patent No.: US 9,181,067 B1
(45) Date of Patent: Nov. 10, 2015

(54) SUSPENDED PAYLOAD STABILITY DEVICE

(71) Applicant: The United States of America as Represented by the Secretary of the Army, Washington, DC (US)

(72) Inventors: Daniel J Nyren, Westborough, MA (US); Marc N. Tardiff, Chelmsford, MA (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/306,457

(22) Filed: Jun. 17, 2014

(51) Int. Cl.
| B66C 1/00 | (2006.01) |
| B66C 1/12 | (2006.01) |
| B66C 1/22 | (2006.01) |
| B66C 1/10 | (2006.01) |

(52) U.S. Cl.
CPC .............. *B66C 1/122* (2013.01); *B66C 1/101* (2013.01); *B66C 1/22* (2013.01)

(58) Field of Classification Search
CPC .......... B66C 1/12; B66C 13/06; B66C 1/663; B66C 1/32; B66C 1/02; B66C 1/422; B66C 1/64; B66C 1/62; B66C 1/122; B66C 1/22; B66C 1/101; B66F 9/181; B66F 9/12; B23Q 7/04; B64D 1/06
USPC ....................................................... 294/81.1
See application file for complete search history.

(56) References Cited

U.S. PATENT DOCUMENTS

| 3,034,659 A | * | 5/1962 | Willison et al. | 212/175 |
| 3,044,819 A | * | 7/1962 | Pierre | 294/198 |
| 3,747,877 A | | 7/1973 | Drew | |
| 3,904,156 A | | 9/1975 | Smith | |
| 4,185,862 A | | 1/1980 | Slocombe | |
| 4,500,056 A | | 2/1985 | Della-Moretta | |
| 4,741,501 A | | 5/1988 | Clelford et al. | |
| 5,354,112 A | * | 10/1994 | Hara et al. | 294/81.41 |
| 5,871,249 A | | 2/1999 | Williams | |
| 6,138,846 A | * | 10/2000 | Baumann | 212/326 |
| 6,986,484 B2 | | 1/2006 | Scott | |
| 7,887,011 B1 | | 2/2011 | Baldwin | |
| 7,954,766 B2 | | 6/2011 | Brainard et al. | |
| 8,185,259 B2 | | 5/2012 | Omar | |
| 8,190,307 B2 | | 5/2012 | Omar | |
| 2011/0140470 A1 | * | 6/2011 | Mills et al. | 294/81.41 |
| 2013/0054054 A1 | | 2/2013 | Tollenaere | |

* cited by examiner

*Primary Examiner* — Stephen Vu
(74) *Attorney, Agent, or Firm* — Roger C. Phillips (57) ABSTRACT

A stability device for a payload suspended from a payload sling includes a first wind deflecting member having a leading edge portion and a trailing edge portion; a second wind deflecting member having a leading edge portion and a trailing edge portion; the first wind deflecting member and the second wind deflecting member forming a substantially V-shaped structure; a tip portion of the V-shaped structure comprising the leading edge portion of the first wind deflecting member and the leading edge portion of the second wind deflecting member; an open portion of the V-shaped structured comprising the trailing edge of the first wind deflecting member and the trailing edge of the second wind deflecting member; and a securing mechanism removably coupling the payload stability device to the payload.

8 Claims, 5 Drawing Sheets

SUSPENDED PAYLOAD STABILITY DEVICE

STATEMENT OF GOVERNMENT INTEREST

The invention described herein may be manufactured and used by or for the U.S. Government for governmental purposes without the payment of any royalties thereon or therefor.

FIELD

The aspects of the present disclosure relate generally to the field of suspended payload stabilization systems, and in particular to a portable payload stabilization device.

BACKGROUND

Maintaining the stability of a payload being transported suspended from an aircraft during flight provides a number of challenges. Some approaches to the challenges associated with suspended payload stabilization include rear attached fins, kite tails and dynamic stabilization. However, these systems tend to be large and bulky. In some cases, these systems become a permanent fixture to the payloads, which can reduce the performance of the item when in use.

In helicopter lifting applications, helicopters are used to lift equipment and transport the equipment to locations not easily accessible by crane or land vehicles. As the helicopter moves to that location, the payload must be stable so as to not endanger the aircrew, ground crew, bystanders or the equipment. A stable payload equates to a safer work environment, shorter transportation time and longer aircraft range. A more stable payload reduces operational costs and increases the distances a payload may be transported without refueling.

Fins that are used in payload stabilization are traditionally made from various types of rigid materials and are located on the rear of the payload. When on the rear of the payload, the fin tends to be behind the point of rotation of the payload. This keeps the payload oriented in parallel with the airflow and increases the stability. However, to increase effectiveness the fin is required to be secured permanently to the payload. When the fin is designed as a permanent structure to the payload, the fin or stability equipment cannot be moved from one payload to another and restricts flexibility. A permanent fin system can also prevent the load from conducting its primary purpose.

The fins must also be placed on the payload in such a manner that the fins interact with the free stream airflow. In some instances of this type of configuration, the payload may block some of the air and create turbulence, reducing the effectiveness of the fin system.

Kite tails or streamers can be secured to the rear of the payload to stabilize the payload or equipment. However, the disadvantages of this approach include the kite tail or streamer becoming entangled with the aircraft equipment, which can include for example, the rotor blades of a helicopter. To prevent the streamer from contacting the rotor blades, the streamer is typically constructed of a heavy chain and a large heavy item is secured to the end. This increases the weight of the system and decreases the performance characteristics of the aircraft.

Dynamic stabilization requires complex and bulky electronics with high powered computing systems to monitor the payload movement and provide a stabilizing force to counteract the moving force. These dynamic systems tend to be power intensive and require a significant amount of calibration for the complex instrumentation. The cost to use and maintain this type of system can be extensive, depending upon the size of the payload and the expected restoring forces required to be generated.

Accordingly, it would be desirable to provide a suspended payload stability device that addresses at least some of the problems identified above.

BRIEF DESCRIPTION OF THE DISCLOSED EMBODIMENTS

As described herein, the exemplary embodiments overcome one or more of the above or other disadvantages known in the art.

One aspect of the exemplary embodiments relates to a stability device for a payload suspended from a payload sling. In one embodiment the stability device includes a first wind deflecting member having a leading edge portion and a trailing edge portion; a second wind deflecting member having a leading edge portion and a trailing edge portion; the first wind deflecting member and the second wind deflecting member forming a substantially V-shaped structure; a tip portion of the V-shaped structure comprising the leading edge portion of the first wind deflecting member and the leading edge portion of the second wind deflecting member; an open portion of the V-shaped structured comprising the trailing edge of the first wind deflecting member and the trailing edge of the second wind deflecting member; and a securing mechanism coupling, so that it is removable, the payload stability device to the payload.

Another aspect of the disclosed embodiments is directed to a suspended payload system for transporting a payload. In one embodiment, the suspended payload system includes a set of lifting legs for attachment to the payload, wherein one lifting leg is attached in a respective corner area of the payload. A first pair of spaced apart support members are removably coupled at one end to a first lifting leg in a first corner area of the payload and at an other end to a second lifting leg in an opposing, second corner area of the payload. A second pair of spaced apart support members are removably coupled at one end to a third lifting leg in a third corner area of the payload and at an other end to a fourth lifting leg in an opposing, fourth corner area of the payload. A substantially V-shaped wind deflector member includes a first panel having a leading edge and a trailing edge; a second panel having a leading edge and a trailing edge; a leading portion of the wind deflector member formed by the leading edge of the first panel and the leading edge of the second panel; a trailing portion of the wind deflector member formed by the trailing edge of the first panel and the second panel; and wherein the leading portion of the wind deflector member is disposed near a point of rotation of the payload and in a direction of travel of the payload.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

DETAILED DESCRIPTION OF THE EXEMPLARY EMBODIMENTS OF THE DISCLOSURE

Figure 1:
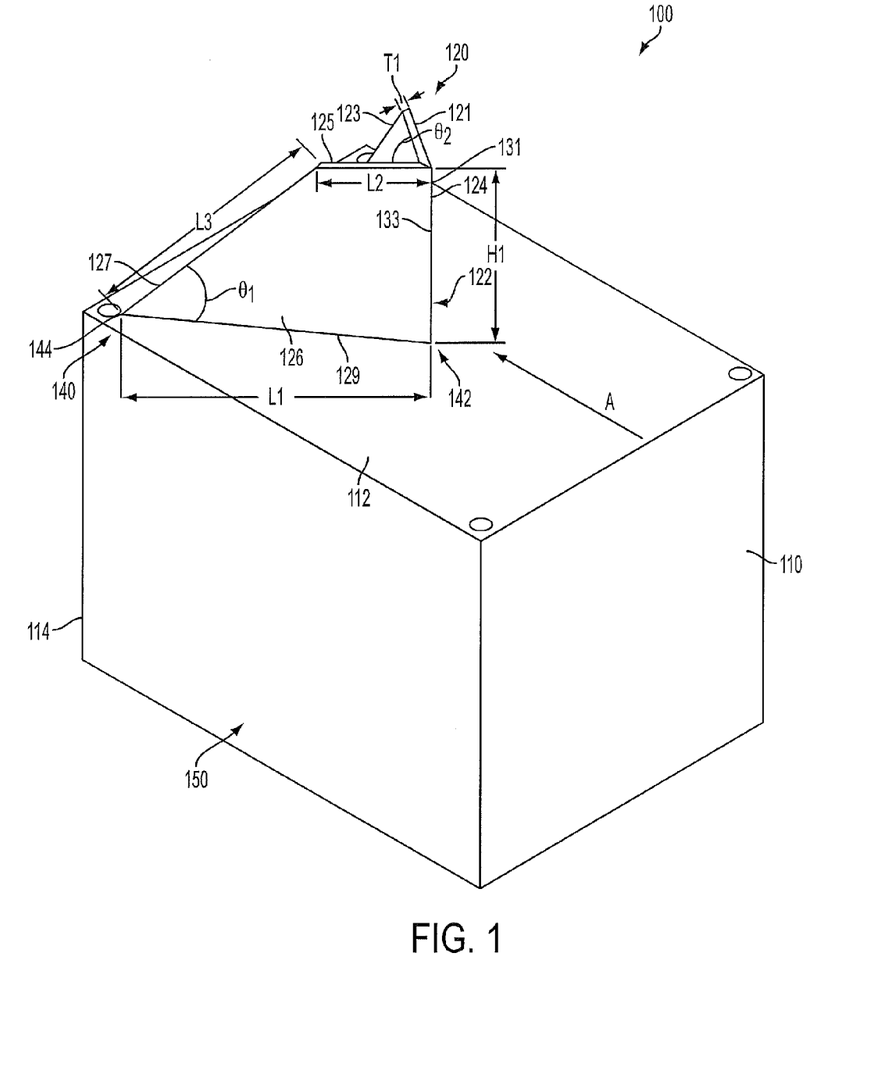
FIG. 1 illustrates a perspective view of one embodiment of a suspended payload stability device incorporating aspects of the present disclosure.

Referring to FIG. 1, one embodiment of a payload system 100 incorporating aspects of the disclosed embodiments is illustrated. The aspects of the disclosed embodiments are directed to a payload stability device 120 that can be used to increase the stability of a payload 110 that is suspended in a medium, such as air or water.

As shown in FIG. 1, the system 100 includes a payload 110 and the payload stability device 120. In the embodiment shown in FIG. 1, the payload stability device 120 is attached on a top portion or surface 112 of the payload 110. In accordance with the aspects of the disclosed embodiments, the payload stability device 120 is generally configured to be positioned on the payload 110 so that a majority of the projected side area 150 of the payload stability device 120 is behind a center or point of rotation (POR) 142 of the payload 110. The point of rotation 142, also referred to as the center of mass or center of gravity, is generally a region where the lifting legs confluence point of the payload lifting device is projected upon the payload 110, as will be further described herein.

The aspects of the disclosed embodiments advantageously provide for the payload stability device 120 to be removably or temporarily coupled to the payload 110. The payload stability device 120 of the present disclosure does not rely on permanent attachments to the payload 110 and is configured to be easily attached to and removed from the payload 110. The aspects of the disclosed embodiments allow for the payload stability device 120 to be secured to the payload 110 without special consideration for the securing system or the particular payload. This means that the payload stability device 120 can be secured to the payload 110 during lifting and transport operations, and then removed and made available for reuse on or with the same or another payload, without the need for substantial modification or repair. Although the payload 110 is generally shown in the form of a box or container, the aspects of the disclosed embodiments are not so limited, and the payload 110 can comprise any suitable payload as will generally be understood. For example, the payload 110 can comprise a vehicle or machinery.

As is illustrated in the example of FIG. 1, the payload stability device 120 of the disclosed embodiments is disposed on the top surface or portion 112 of the payload 110 to allow the payload stability device 120 to interact with the free stream air flow and to be able to readily attach to the payload 110, or other supporting mechanism, as will be described herein. Although the aspects of the disclosed embodiments will generally be described herein with respect to the top portion 112 of the payload 110, the position of the payload stability device 120 on the payload 110 can be on any side or surface of the payload 110 that is substantially parallel to the airflow to affect the pitch, yaw, roll and overall swinging stability of the payload 110.

In the example of FIG. 1, the payload stability device 120 is in the form of a substantially V-shaped structure, generally referred to herein as a "fin." The V-shaped fin structure generally comprises a leading edge or tip portion 122 and a pair of side panels, indicated as panels or members 124, 126. The panels 124, 126 generally form the wind deflecting member, or members, of the payload stability device 120. Alternatively, the side panels 124, 126 can also be referred to as a "fin" or "fins."

Member 124 has a leading edge portion 131 and a trailing edge portion 123. Member 126 has a leading edge portion 133 and a trailing edge portion 127. In one embodiment, the leading edge portions 131, 133 of the members 124, 126, respectively, are positioned to form the tip portion 122 of the payload stability device 120, also referred to as the leading edge 122. The orientation of the members 124, 126 relative to one another as is shown in FIG. 1, provides the generally "V" shaped structure of the payload stability device 120. In the example of FIG. 1, the payload stability device 120 is oriented so that the tip portion 122 of the payload stability device 120, in this example, the tip of the V-shape structure, is pointed into the oncoming airflow stream, the direction of which is generally indicated by the arrow A.

Figure 2:
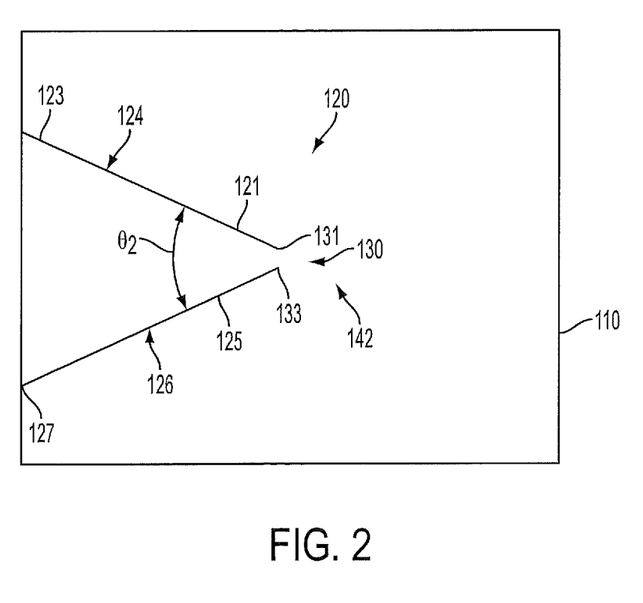
FIG. 2 illustrates a top view of the suspended payload stability device illustrated in FIG. 1.

In the example of FIG. 1, the leading edge portion 131 and leading edge portion 133 come together to form the tip portion 122. Alternatively, in one embodiment, a gap or separation can be formed between the leading edge portions 131, 133. Referring to FIG. 2, in one embodiment, the leading edge portion 131 and leading edge portion 133 are spaced apart to form gap 130 between the leading edge portion 131 and leading edge portion 133. Providing a gap 130 between the leading edge portions 131 and 133 at the leading edge or tip portion 122 can help control flow. In one embodiment, a size of the gap 130 is approximately 3-6 inches.

The payload stability device 120 is positioned on the payload 110 to direct the airflow in such a way to increase the stability of the payload 110 in high wind conditions. Typically, the trailing edges 123, 127 of the members 124, 126 used for stabilization are located at the furthest distance aft, or rear of the front wall, from the point of rotation 142 of the payload 110. In the example of FIG. 1, the rear tip 144 of the payload stability device 120 is aligned substantially vertically to the rear wall 114 of the payload 110.

In the example shown in FIG. 1, an upper or top surface portion 121 of the member 124 is substantially horizontal, while the trailing edge portion 123 is angled. A similar configuration exists with respect to the upper or top surface portion 125 and trailing edge portion 127 of member 126. As shown in FIG. 1, an angle $\theta_1$ is shown defined between the trailing edge portion 127 and the base portion 129 with respect to member 126. Member 124 is similarly configured. In one embodiment, the angle $\theta_1$ shown in the example of FIG. 1 is approximately 60 degrees. In alternate embodiments, the angle $\theta_1$ can be any suitable angle in the range of 0 to 90 degrees. The angle $\theta_1$ should be sufficient to prevent the payload stability device 120 from interfering with the lifting legs of the payload 110, such as the payload legs 342-348 shown in FIG. 3, which will be described further herein. In one embodiment, the angle $\theta_1$ generally corresponds to the angle of the corresponding payload lifting leg, relative to the payload 310.

The payload stability device 120 will have a height, shown in the example of FIG. 1 as H1. The height H1 can be varied depending upon the particular application and will generally be between 0-1 times the approximate height of the payload 110. In the example of FIG. 1, the height H1 is approximately one-half the height of the payload 110.

The payload stability device 120 will also have a length, which is generally defined as the length L1 of each of the members 124, 126. In the example of FIG. 1, only the length L1 of member 126 is shown. The length of member 124 will generally correspond to the length of member 126. In one embodiment, the length L1 of the member 126 is sufficient to extend from the corner region 140 of the payload 110 to an area corresponding to the point of rotation 142 on the top portion 112 of the payload 110. While the size of the payload stability device 120 is not fixed in terms of height and length, the projected geometric center of the payload stability device 120, which is substantially perpendicular to the flow A, should be behind the point of rotation 142.

As shown in the example of FIG. 1, a top portion 125 of the payload stability device will generally have a length L2 that is shorter than a length L1 of a bottom portion 129. The length L2 is chosen so as to avoid any interference between the payload stability device 120 and the lifting legs of the payload 110, such as the payload legs 342-348 shown in FIG. 3. In one embodiment, the length of L2 is based on, or determines, the angle $\theta_1$ and the height H1, discussed above. The length L3 of the trailing edge members 123, 127 is based on, or determined by, the lengths L1 and L2 and the height H1.

The members 124, 126 of the payload stability device 120 will have a thickness that is generally defined by T1. In one embodiment, the thickness T1 of the panels 124, 126 of the payload stability device 120 will generally be dependent upon the type of material used for the payload stability device 120, and the desired rigidity and flexibility. In one embodiment, the thickness T1 is in the range of for example, approximately 0.125 inches up to and including two inches. In alternate embodiments, the payload stability device 120 can have any thickness that will achieve the desired rigidity or flexibility of the payload stability device 120.

In one embodiment, the payload stability device 120 of FIG. 1 is constructed from a lightweight material. The material can be rigid, semi-rigid, as well as flexible, depending upon the particular application. Typical considerations for the material of the payload stability device 120 are the size of the payload 110 and the typical airspeed and airflow the payload 110 will be subjected to. For example, at low air speeds, a textile type material might be used. At higher air speeds, more rigidity is needed, so a more rigid plastic or metal material can be considered. In one embodiment, the material forming the payload stability device 120 is a polymer, which provides a minimal relative flexibility. In alternate embodiments, the material of the payload stability device 120 can comprise one or more of woven fabrics, non-woven fabrics, thin films, ropes and cords. In one embodiment, the payload stability device 120 can comprise a combination of fabric and plastic. In alternate embodiments, the material comprising the payload flexibility device 120 can comprise any material, or combination thereof, that provides the desired rigidity or flexibility.

Figure 3:
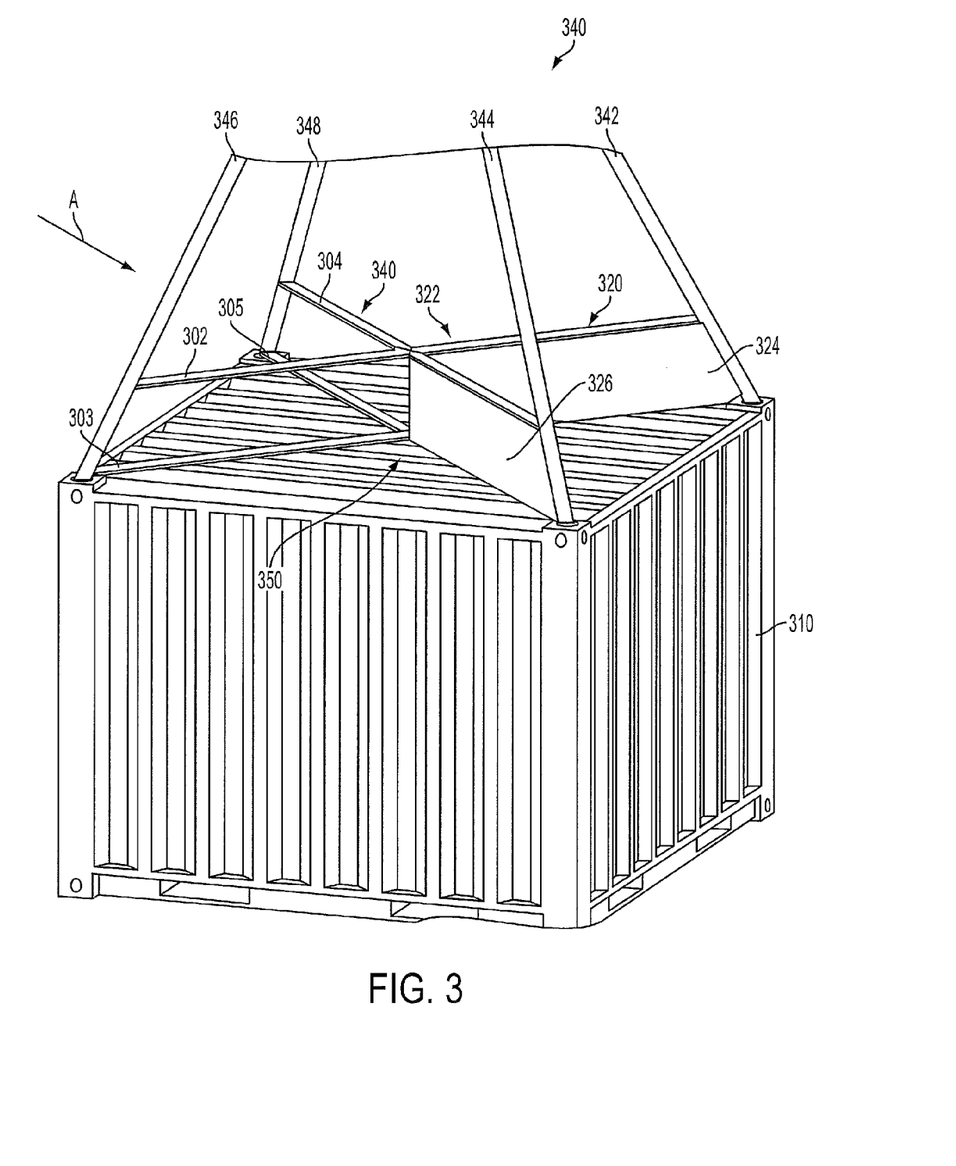
FIG. 3 illustrates a perspective view of one embodiment of a suspended payload stability device incorporating aspects of the present disclosure.

The payload stability device 120 of the present disclosure is also configured to be stored with, or as part of, the corresponding payload. For example, in a sling load environment, such as shown in FIG. 3, storing the payload stability device 320 with the payload 310 can be a requirement. The flexible nature of the payload stability device 320 allows it to be stored with the payload 310 and redeployed when needed. For example, in one embodiment, the payload stability device 320 can be folded into a smaller package that allows it to be stored.

Slings or sling sets are commonly used to lift and move payloads. FIG. 3 illustrates one embodiment of a payload stability device 320 incorporating aspects of the present disclosure. In this example, the payload stability device 320 is disposed on the top of payload 310. The payload 310 of this embodiment includes, or is configured to be coupled to, a sling or sling set 340. The sling set 340 has lifting legs 342, 344, 346 and 348 in each of the corner regions. As generally discussed above, in one embodiment, the point of rotation 350 is determined by projecting the confluence point where the lifting legs 342, 344, 346 and 348 join together, referred to as the lifting legs confluence point, downwards upon the payload 310. In one embodiment, the payload stability device 320 shown in FIG. 3 is configured to be attached to the sling set 340. As illustrated in the embodiment of FIG. 3, the payload stability device 320 is attached to the sling set 340 by supporting structures 302, 303, 304, 305 also referred to as "connecting cordage." The supporting structures 302, 303, 304, and 305 are generally configured as pairs between the respective lifting legs 342, 346 and 344, 348 of the sling set 340, generally in an "X" type of formation. The supporting structures 302, 303, 304 and 305 of the payload stability device 320 can be attached to the sling set 340 using any suitable attachment mechanism, such as by tying or clamping and looping material. The supporting structures 302, 303, 304 and 305 will also be attached or mechanically fastened to the members or structures 324, 326 in a suitable manner, such as by clamping or sewing, for example.

Since the payload stability device 320 attaches to the sling set 340 and not the payload 310, the payload stability device 320 of the disclosed embodiments can be used in conjunction with any payload 310 that utilizes or has a sling set attached thereto. This allows for the payload stability device 320 to be moved from one payload system to another or different payload system with minimal effort. The payload stability device 320 will also function with payloads having complex geometries.

In the example of FIG. 3, the fin or rear "V" shaped structure or section 322 is constructed with a low permeability material, meaning that one or both of the members 324, 326 comprises a low permeability material. The forward inverted "V" shape area or section 330 is left empty, as shown in the example of FIG. 3, meaning that there are no structures similar to members 324 and 326 in section 322. In the absence of any such structures in section 330, any air or wind can pass through easily.

Alternatively, the section 340 can comprise a high permeability material. For example, structures similar to members 324 and 326 can be disposed between the respective pairs of support members 302, 303 and 304, 305. In this embodiment, the payload stability device 320 must be suitably sized and positioned on the payload 310 so that a majority of the V-shaped structures 330 and 322 are behind the point of rotation 342 of the payload 310.

Figure 4:
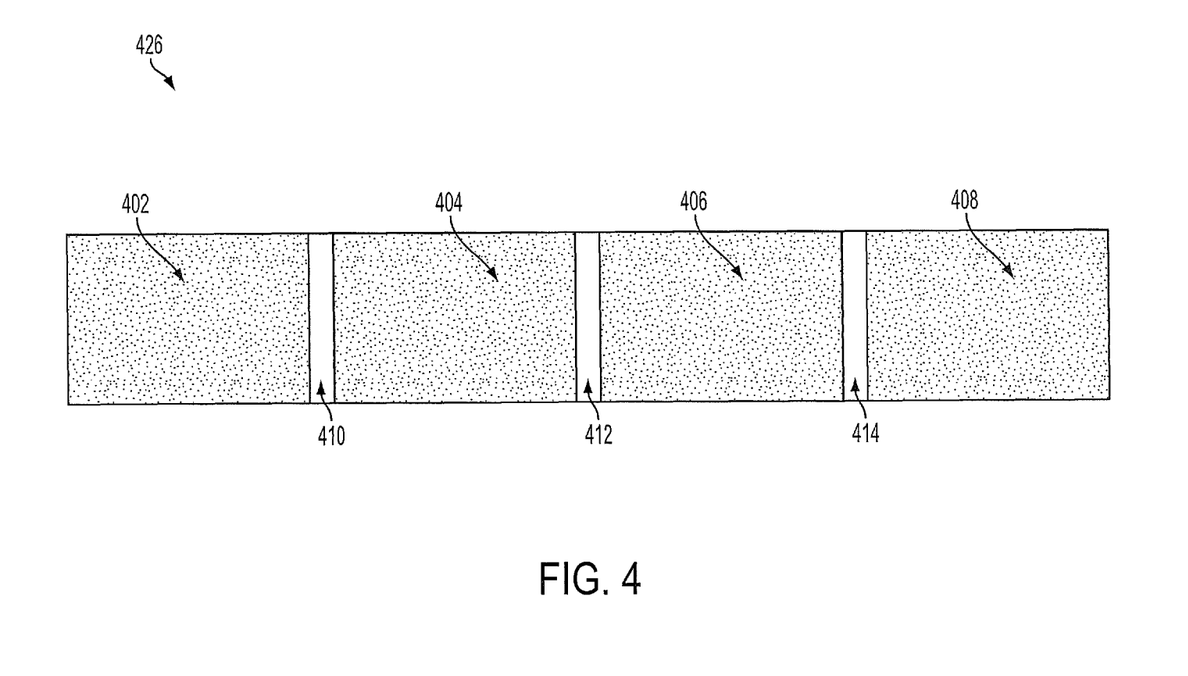
FIG. 4 illustrates a schematic block diagram of one embodiment a suspended payload stability device incorporating aspects of the present disclosure.

In one embodiment, the payload stability device 120 of FIG. 1 is configured to be folded up when not being used. FIG. 4 illustrates one embodiment of a wind deflecting surface or member 426 for the payload stability device 120 of FIG. 1, incorporating aspects of the present disclosure. In this example, the wind deflecting member 426, generally corresponding to the panels or wind deflecting surfaces 124 and 126 of FIG. 1, is configured to be folded into a small, generally lightweight package. In the example of FIG. 4, the wind deflecting member 426 comprises a series of smaller sections or members 402, 404, 406 and 408. The sections 402, 404, 406 and 408 are generally rigid or semi-rigid members. In between the sections 402, 404, 406 and 408 are flexible sections or members 410, 412 and 414. The flexible sections 410, 412 and 414 separate the sections 402, 404, 406 and 408 as is shown in FIG. 4. The flexible sections 410, 412, 414 are attached to the sections 402, 404, 406 and 408 in any suitable manner, such as by sewing, stapling or stitching, for example. This allows the wind deflecting member 426 to be folded up after use. Although four sections 402, 404, 406 and 408 are shown in the example of FIG. 4, it should be understood that the wind deflecting member 426 for the payload stability device 120 can include more or less than four sections or panels. For example, in one embodiment, the wind deflecting member 426 can comprise between two and five sections.

Figure 5:
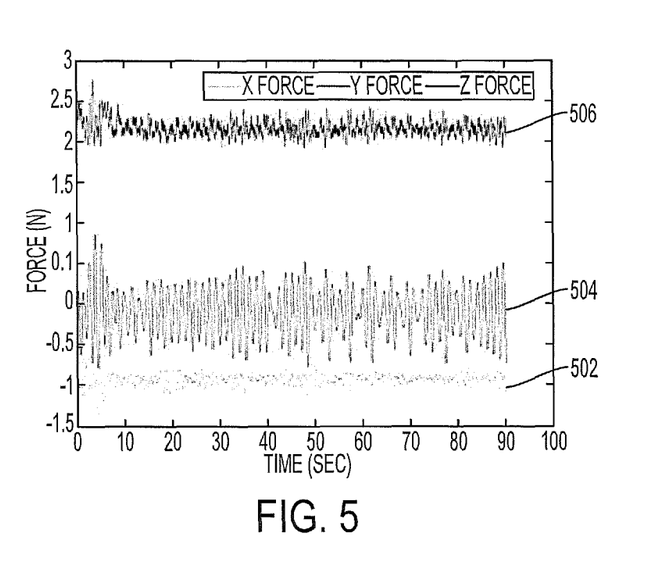
FIGS. 5-6 are graphs illustrating the results of wind tunnel testing of a small scale model of a suspended payload stability device incorporating aspects of the present disclosure.

One embodiment of the payload stability device 120 illustrated in FIG. 1 was tested in a small scale wind tunnel. In this test, the payload stability device 120 comprises a rigid V-shaped fin structure. The payload 110 in this example was hung from a force transducer that measures forces in three directions. FIG. 5 illustrates the results of the baseline tests of the small scale rectangular payload 110 hanging from the ceiling of the wind tunnel without the V-shaped fin structure. In this test, the airspeed was approximately 10 meters/second, and the X direction is parallel to the airflow of the wind tunnel. The Y-direction is perpendicular to the airflow, but parallel to the ceiling of the wind tunnel. The Z-direction is perpendicular to the ceiling of the wind tunnel. Graph 502 illustrates the resultant forces in the X-direction, graph 504 the Y-direction and graph 506 the Z-direction.

Figure 6:
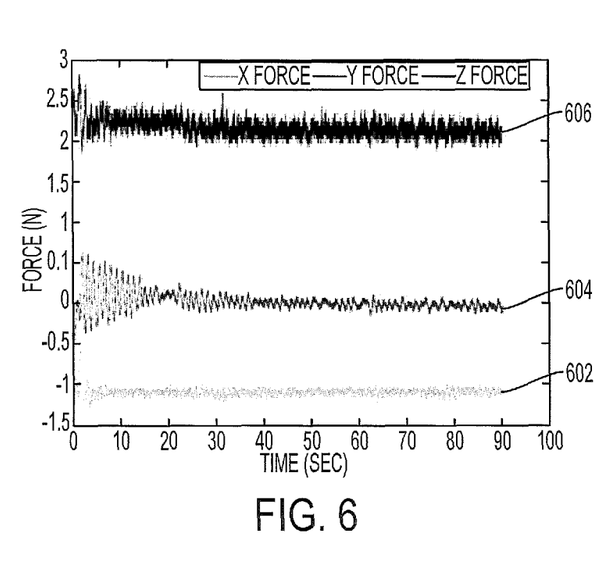

FIG. 6 illustrates the results of the same test when the payload stability device 120 of the disclosed embodiments is attached to the top of the payload 110. Graph 602 illustrates the resultant forces in the X-direction, graph 604 the Y-direction and graph 606 the Z-direction. By comparing the graphs of FIG. 5 and FIG. 6, it can be seen that generally, the amplitude of the oscillations in both the X and Y directions are reduced. This is generally indicative of an increase in stability.

The payload stability device 120 of the present disclosure is configured to be used commercially with any and all equipment used for commercial lifting. The primary application will be with crane and helicopter lifting applications where lifted payload orientation is important or the potential for lifting sling wind-up is high.

Other potential applications for the payload stability device of the disclosed embodiments can include seaports, construction sites and other locations where equipment needs to be lifting, primarily utilizing cranes and helicopters. Military applications can allow helicopter sling load to be a more effective means of transportation.

The aspects of the disclosed embodiments provide a payload stability device that increases the stability of the payload. The payload stability device of the present disclosure is generally configured to be disposed on a payload in a manner that allows the payload stability device to be easily removed and used with another payload. The payload stability device of the disclosed embodiments can be secured to the lift assembly for payload, such as a sling, which increase the portability of the payload stability device from one payload to another payload. The payload stability device of the disclosed embodiments can also be flexible in nature, to allow the payload stability device to be folded and stored with the payload.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A suspended payload system for transporting a payload, comprising:
    a set of lifting legs for attachment to the payload, wherein one lifting leg is disposed in a respective corner area of the payload;
    a first pair of spaced apart support members, the first pair of spaced apart support members being removably coupled at one end to a first lifting leg in a first corner area of the payload and at an other end to a second lifting leg in an opposing, second corner area of the payload;
    a second pair of spaced apart support members, the second pair of spaced apart support members being removably coupled at one end to a third lifting leg in a third corner area of the payload and at an other end to a fourth lifting leg in an opposing, fourth corner area of the payload; and
    a substantially V shaped wind deflector member comprising:
        a first panel having a leading edge and a trailing edge;
        a second panel having a leading edge and a trailing edge;
        a leading portion of the wind deflector member formed by the leading edge of the first panel and the leading edge of the second panel;
        a trailing portion of the wind deflector member formed by the trailing edge of the first panel and the second panel; and
    wherein the leading portion of the wind deflector member is disposed near a point of rotation of the payload and in a direction of travel of the payload.

2. The suspended payload system of claim 1, wherein the leading edge of the first panel is joined to the leading edge of the second panel to form the leading portion of the wind deflector member.

3. The suspended payload system of claim 1, wherein the leading edge of the first panel and the leading edge of the second panel are aligned on the payload with a gap therebetween to form the leading portion of the wind deflector member.

4. The suspended payload system of claim 1, wherein the wind deflector member is disposed behind a point of rotation of the payload with respect to the direction of travel.

5. The suspended payload system of claim 1, comprising:
    a substantially V-shaped area defined by the first pair of spaced apart support members and the second pair of spaced apart support members;

a tip of the substantially V-shaped area formed by an intersection of the first pair of spaced apart support members and the second pair of spaced apart support members.

6. The suspended payload system of claim 5, wherein the substantially V-shaped area extends away from the substantially V-shaped structure.

7. The suspended payload system of claim 6, wherein an area between the first pair of support members of the substantially V-shaped area and an area between the second pair of support members of the substantially V-shaped area is open.

8. The suspended payload system of claim 6, comprising:
   a first high permeability material coupled to and between the first pair of support members in the substantially V-shaped area;
   a second high permeability material coupled to and between the second pair of support members in the substantially V-shaped area.

* * * * *